US012214476B2

(12) United States Patent
Greuel

(10) Patent No.: US 12,214,476 B2
(45) Date of Patent: Feb. 4, 2025

(54) SWITCHABLE PLIERS AND METHOD FOR USE

(71) Applicant: A & E INCORPORATED, Racine, WI (US)

(72) Inventor: Billy Greuel, Waterford, WI (US)

(73) Assignee: A & E INCORPORATED, Racine, WI (US)

(*) Notice: Subject to any disclaimer, the term of this patent is extended or adjusted under 35 U.S.C. 154(b) by 311 days.

(21) Appl. No.: 17/691,421

(22) Filed: Mar. 10, 2022

(65) Prior Publication Data

US 2023/0286122 A1 Sep. 14, 2023

(51) Int. Cl.
*B25B 27/20* (2006.01)

(52) U.S. Cl.
CPC .................................. *B25B 27/205* (2013.01)

(58) Field of Classification Search
CPC .... B25B 7/00; B25B 7/02; B25B 7/04; B25B 7/10; B25B 7/12; B25B 7/14; B25B 7/18; B25B 7/22; B25B 27/14; B25B 27/20; B25B 27/205; Y10T 29/53613; Y10T 29/5363
See application file for complete search history.

(56) References Cited

U.S. PATENT DOCUMENTS 3,995,360 A 12/1976 Millheiser
4,172,623 A 10/1979 Weglage
4,280,266 A 7/1981 Murphy
4,476,750 A 10/1984 Murphy
4,621,401 A 11/1986 Anderson
4,702,001 A 10/1987 Malm et al.
4,790,056 A 12/1988 Anderson
4,862,572 A 9/1989 Jeromson, Jr. et al.
4,896,661 A * 1/1990 Bogert ............... A61B 17/2812 606/86 R
5,007,313 A 4/1991 Jeromson, Jr. et al.
5,079,977 A 1/1992 Petrie
5,174,177 A 12/1992 Jeromson, Jr. et al.
5,542,167 A * 8/1996 Nakamoto ................ B25B 7/04 81/424
5,826,467 A 10/1998 Hoang
5,865,075 A 2/1999 Medved
6,145,417 A 11/2000 Bates et al.
6,249,946 B1 6/2001 Greenhill
6,378,403 B1 4/2002 Estes et al.
6,470,774 B2 10/2002 Chang
(Continued)

FOREIGN PATENT DOCUMENTS

DE 8911388 1/1991
EP 2329920 6/2011
TW I474897 B 3/2016

OTHER PUBLICATIONS

International Search Report from PCT/US2023/060308 dated Apr. 26, 2023; 3 pgs.

(Continued)

*Primary Examiner* — Robert J Scruggs
(74) *Attorney, Agent, or Firm* — RYAN KROMHOLZ & MANION, S.C.

(57) ABSTRACT

A pliers switchable for use with external snap-rings and internal snap-rings is disclosed. A jaw assembly with easily changeable tips is provided, and to be more convenient for the end-user, a spring loaded tip release mechanism and jaw assembly is provided.

8 Claims, 3 Drawing Sheets

(56) References Cited

U.S. PATENT DOCUMENTS

| | | | | |
|---|---|---|---|---|
| 6,983,677 | B1 | 1/2006 | Engel | |
| 7,055,413 | B1 * | 6/2006 | Wang | B25B 7/04 29/229 |
| 7,194,936 | B2 | 3/2007 | Engel et al. | |
| 7,497,150 | B1 * | 3/2009 | Huang | B25B 7/18 81/302 |
| 9,073,193 | B2 * | 7/2015 | Zeng | B25B 7/04 |
| D738,174 | S | 9/2015 | Engel et al. | |
| D742,194 | S | 11/2015 | Engel et al. | |
| D775,916 | S | 1/2017 | Ludtke et al. | |
| D789,169 | S | 6/2017 | Rode et al. | |
| 9,821,439 | B2 | 11/2017 | Smith | |
| D809,888 | S | 2/2018 | Dahl et al. | |
| 10,100,872 | B1 | 10/2018 | Rode et al. | |
| 10,107,331 | B1 | 10/2018 | Rode | |
| 10,151,343 | B2 | 12/2018 | Rode | |
| 10,421,178 | B2 | 9/2019 | Engel et al. | |
| 10,532,451 | B2 | 1/2020 | Rode et al. | |
| 10,718,368 | B2 | 7/2020 | Rode | |
| 10,968,945 | B2 | 4/2021 | Mesiti | |
| 10,974,544 | B2 | 4/2021 | Strait | |
| 10,983,706 | B2 | 4/2021 | Rode | |
| 2006/0283291 | A1 | 12/2006 | Engel et al. | |
| 2009/0241348 | A1 | 10/2009 | Westerfield | |
| 2011/0162211 | A1 | 7/2011 | Maxey | |
| 2014/0202291 | A1 | 7/2014 | Zeng | |
| 2016/0059397 | A1 | 3/2016 | Chern | |
| 2016/0214246 | A1 | 7/2016 | Yang | |

OTHER PUBLICATIONS

Written Opinion from PCT/US2023/060308 dated Apr. 26, 2023; 4 pgs.

* cited by examiner

SWITCHABLE PLIERS AND METHOD FOR USE

BACKGROUND OF THE INVENTION

The present invention relates broadly to retaining ring pliers used to remove and replace both internal and external retaining rings. Such pliers are convertible between a first position which allows the jaws to move inwardly as the handles are moved inwardly, and a second position which enables the jaws to move outwardly as the handles are moved inwardly.

Pliers, specifically snap-ring pliers are well known in the art. Snap-rings can be either "internal" or "external." In their neutral state, internal snap-rings are generally disposed in a slightly open-loop configuration. They may be used to retain a part within a cylinder, for example, retaining a bearing in a shaft. To install an internal snap-ring the open-loop end is closed to decrease the diameter to fit within the cylinder. The snap-ring is then allowed to open within the cylinder, ideally within a groove. On the other hand, external snap-rings may be used to retain an object on the external side of a shaft, for example, gears or pulleys on a shaft. External snap-rings are generally disposed in a closed-loop configuration. The closed-loop may be spread open to permit the external snap-ring to fit over a shaft, then once in place, the external snap-ring may be released, preferably in a groove about the shaft, to retain the object on the shaft.

Generally, there are internal snap-ring pliers used to install internal snap-rings and external snap-ring pliers to install external snap-rings. Internal snap-ring pliers may consist of a pair of handles which cross at a pivot pin and with a tip at the snap-ring interface end. The crossing configuration allows a closing action of the handles to translate into a closing action of the tips, thus a closing of the open-loop of the internal snap-ring. External snap-ring pliers may consist of a pair of handles connected at a pivot point but do not cross at the pivot point. This configuration allows a closing action of the handles to translate into an opening of the tips, thus spreading the external snap-ring.

Additionally, there are internal/external snap-ring pliers which allow a user to switch between an orientation for use with internal snap-rings and an orientation for use with an external snap-ring. One example is shown in U.S. Pat. No. 7,194,936, which is incorporated herein by reference.

Some switchable devices provide a first handle with a pivot pin affixed to it and a second handle with a v-shape track in which the first handle pin travels within. However, in some orientations during use, one of the handles will be displaced relative to the other due to the orientation of the pin and the groove and the spring force exhibited by a biased snap-ring. This will either twist the snap-ring, making alignment with the groove more difficult, or cause the pliers to disengage from one end of the snap-ring entirely.

In some embodiments of snap ring pliers, the points or tips of the snap ring pliers are fixed. In other embodiments of snap ring pliers, users may select between a plurality of interchangeable points such as hex tips, round tips, angled tips of different angles, and straight tips. The interchangeable points typically require screwing and unscrewing of set screws, or allen wrench to tighten the interchangeable tip into place.

SUMMARY OF THE INVENTION

The present invention relates to a jaw assembly with easily changeable tips. In order to be more convenient for the end-user, a spring loaded tip release mechanism and jaw assembly is provided.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
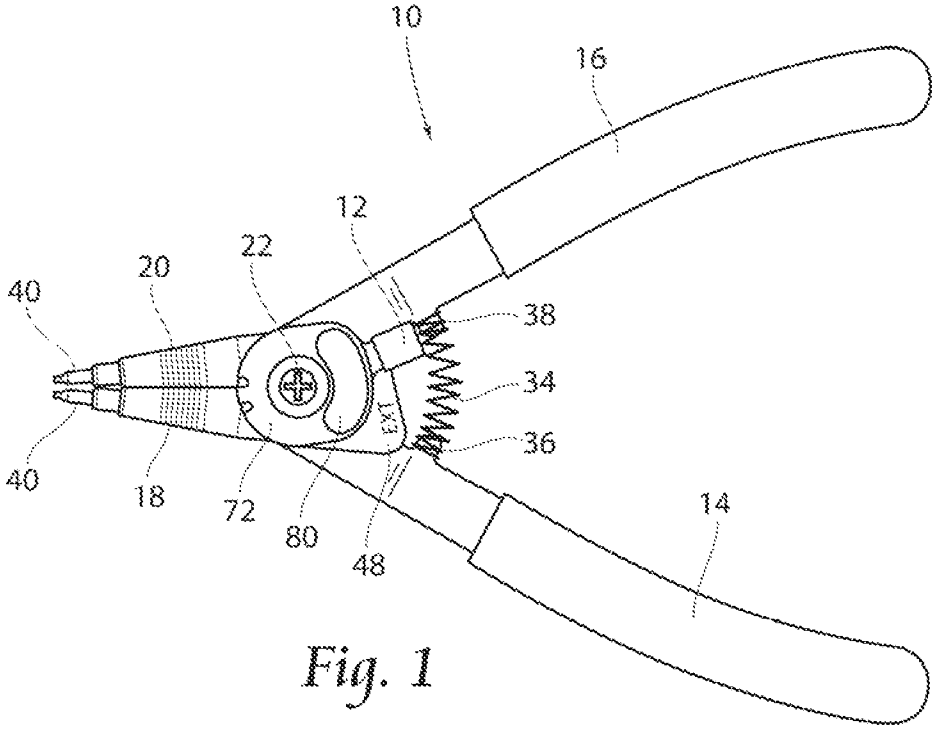
FIG. 1 is a top plan view of a retaining ring pliers having a slidable spring loaded switching mechanism and set in an external ring mode, the pliers being shown with its handles at rest and the jaws together.
Figure 2:
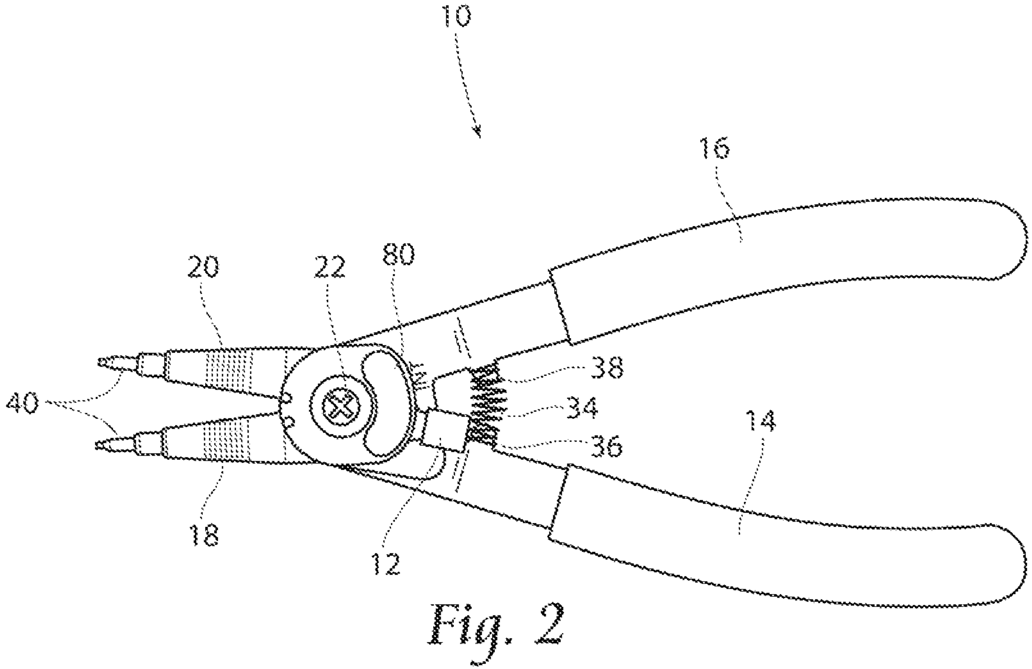
FIG. 2 is a view like FIG. 1 but set in an internal ring mode showing disposition of the handles with a slight squeezing pressure having been applied thereto.
Figure 3:
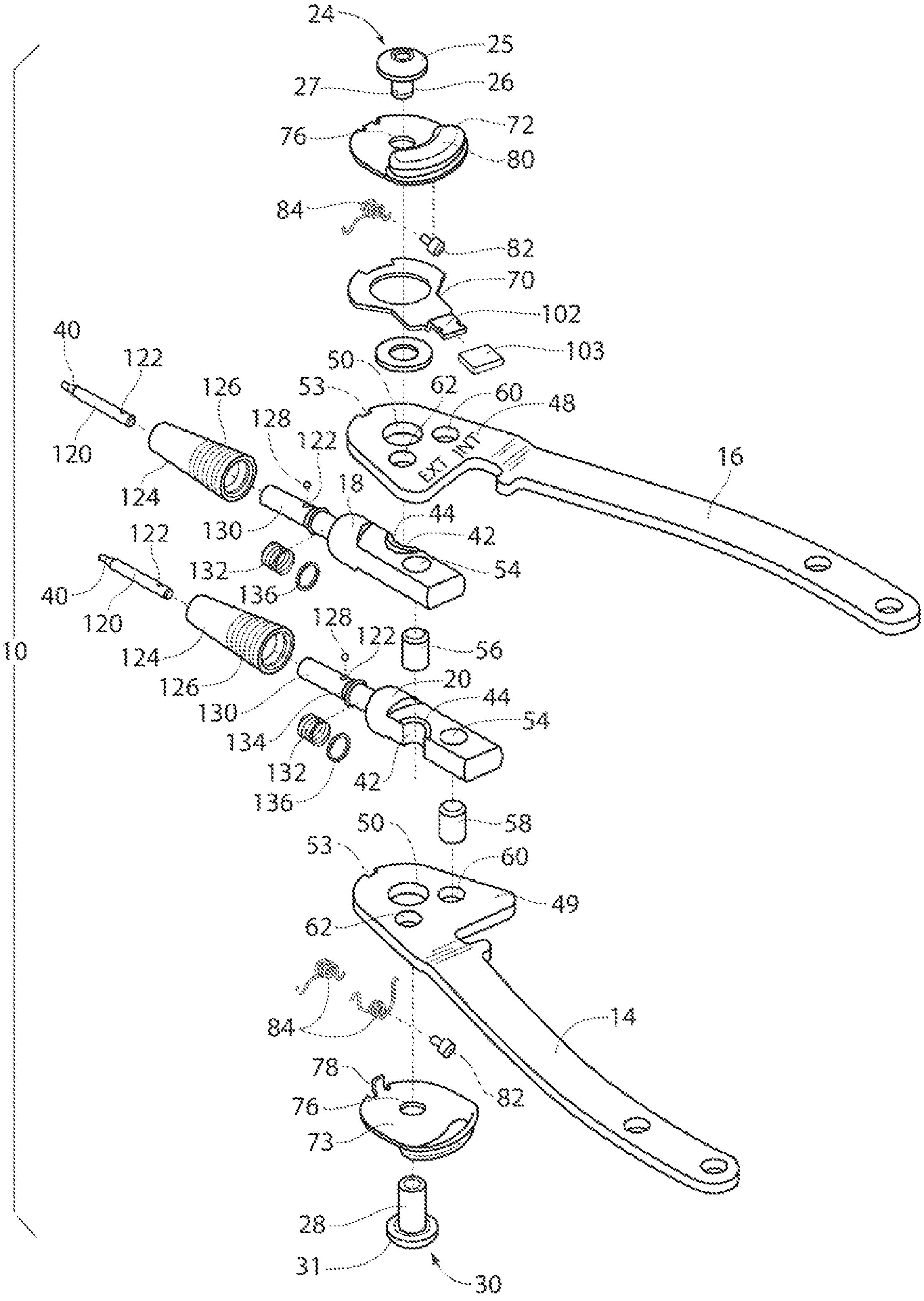
FIG. 3 is an exploded view of the retaining ring pliers.

Referring now to FIGS. 1-3 of the drawings, a convertible retaining ring pliers 10 provided with a slidable switching mechanism 12 is shown. The pliers 10 is generally comprised of a pair of handles 14, 16 a pair of elongated jaws 18, 20 and a pivot pin 22.

The convertible retaining ring pliers 10 is adapted for two operational modes which may be referred to as "the external ring mode" and the "internal ring mode". Referring now to FIGS. 1 and 3, a legend "EXT" is imprinted on end plate 48 of the handle 16 adjacent to bore 62 which is positioned to receive the transfer pin 56, and the legend "INT" is placed on the end plate 48 adjacent to bore 60 which is positioned to receive the transfer pin 58. In the external mode, switchplate actuator 102 is shifted to cover the INT legend and with the EXT legend visible informs the user that the pliers 10 is in the "external ring mode". Similarly, when the pliers 10 is in the "internal ring mode", switchplate actuator 102 covers the EXT legend and provides the visible INT legend "internal ring mode" indication to the user.

The pivot pin 22 is preferably formed by a screw 24 having a head 25, a shank 26 and a threaded shaft 27 which is threadably received in a barrel 28 of a nut 30 with a head 31. The handles 14, 16 include grips that provide covering to the handles which are generally manufactured of a hard metal. The handles 14, 16 are urged apart by a spring 34 disposed between two opposed lugs 36, 38 on the interior sides of both handles 14, 16. In the retaining ring pliers 10 described, the jaws 18, 20 are designed for mounting of work implements in the form of elongated retaining ring tips 40 having operator posts at the distal ends to be received in the lug holes of standard retaining rings.

As best seen in FIGS. 1 and 3, the jaws 18, 20 are disposed in side-by-side relation and have transverse, cylindrically concave bearing recesses 42 for bearing engagement with a cylindrical portion of pivot pin 22. At its opposite faces, each jaw 18, 20 is provided with a projecting semi-circular flange 44 which provides an external bearing shoulder 46 concentric with its bearing recess 42.

The handles 14 and 16 may be fabricated from suitable plate material, such as steel, and are engaged at the opposite ends thereof to define end plates 48, 49 which are disposed parallel to each other to partially confine the jaws 18 and 20 and to enclose other components of the pliers 10 to be described.

The handle end plates 48, 49 are provided with transverse bores 50 to pass the pivot pin 22, and internal cylindrical bearing shoulders for coaction with the bearing shoulders of the jaws 18, 20. Through coaction then of the pivot pin 22 and the bearing shoulders, both jaws 18, 20 and both handles 14, 16 are mounted for rotation about a common defined axis. These principal components are maintained in the operative position by the pivot pin 22. The heads of the handle plates 48, 49 are formed with vertical channels 53 (FIG. 3) for a purpose to be appreciated hereafter.

To effect the convertibility of the pliers 10, means are provided for coupling each of the jaws 13, 20 alternatively to one or the other of the two handles 14, 16. In this manner, each jaw 18, 20 is operatively linked to one or the other of the handles 14, 16 for oscillation therewith about the pivot 22. To accomplish this, each jaw 18, 20 is provided at its inner end with a transverse cylindrical bore 54 (FIG. 3) spaced from and parallel to its respective bearing recess 42. Elongated cylindrical transfer pins 56 and 58 are disposed in these bores 54 and are designed for a close sliding fit within the bores.

The handle end plates 48, 49 are each provided with a pair of transverse bores 60 and 62 spaced from each other and from the pivot pin bore 50 and disposed to be axially aligned with respective bores 54 of the jaws 18, 20 in selective relative position. These handle bores 60, 62 have the same diameter as the bores 54 of the jaws 18, 20 so that when a transfer pin 56, 58 is received within a handle bore 60, 62, that handle 14, 16 is securely coupled to the respective jaw 18, 20. In assembled relation of the pliers 10, it will be seen that the handle end plates 48, 49 are contiguous to the opposite faces of the jaws 18, 20 and maintained in that relation by the pivot pin assembly 22, and it will be seen that the transfer pins 56, 58 are designed for vertical sliding motion within aligned jaw bore 54 and respective handle end plate bores 60, 62.

As seen in FIG. 3, covers 72, 73 are provided and formed by a planar thin plate having a central aperture 76. Switch-plate 70 is interposed and movably mounted adjacent handle plate 48, and carries protective covering 103 surrounding its surface area. Each cover 72, 73 is formed on one side with a switchplate-engaging tab 78 extending at generally 90° relative to the plane of the plate, and is constructed on an opposite side with a kidney-shaped dome 80. Tabs 78 are designed to be aligned in the recesses 53 formed in the heads of handle plates 48, 49. The dome 80 on each cover 72, 73 defines a retaining pocket for holding a spring pin 82 and reaction member in the form of a rocker or torsion spring 84.

Figure 4:
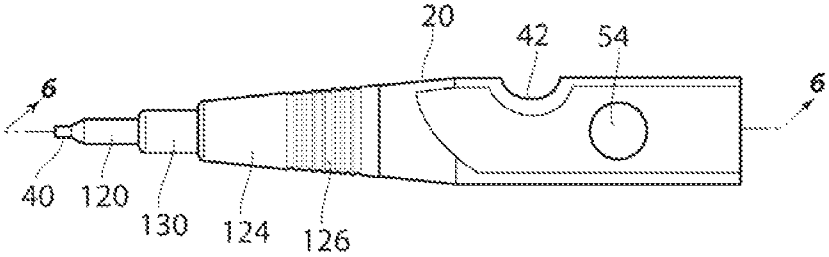
FIG. 4 is a side view of a jaw assembly.
Figure 5:
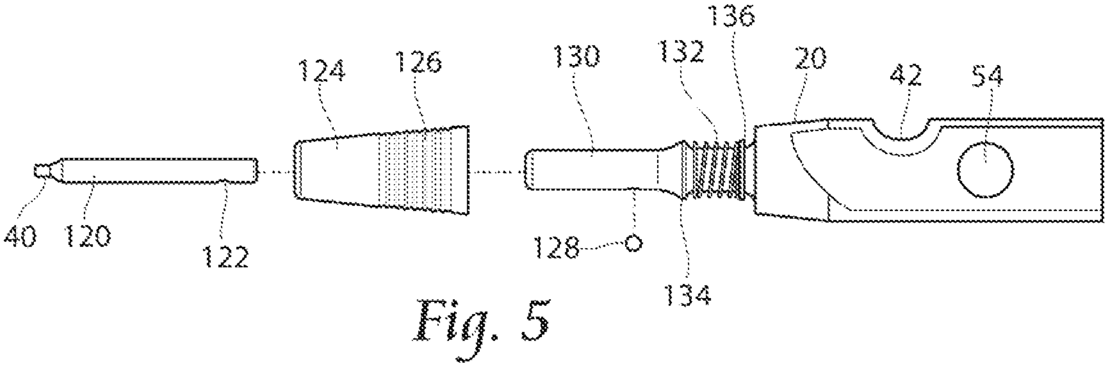
FIG. 5 is an exploded view of the jaw assembly of FIG. 4.

Referring now to FIG. 4 a side view of a jaw assembly 20 is shown. It should be appreciated that jaws 18 and 20 are preferably either identical or mirror images of one another, so that a description of jaw 20 applies equally to jaw 18. As best shown in FIG. 5, which is an exploded view of the jaw assembly of FIG. 4, jaw 20 comprises a hollow jaw shaft 130, which carries within a pocket a ball (of a ball and detent) 128. Shaft 130 has a step 134 configured and dimensioned to contain a spring 132 behind step 134. A sleeve 124, preferably equipped with finger grips 126 is provided about hollow jaw shaft 130. A tip 40 is carried by tip shaft 120, and shaft 120 is provided with detent 122 for receiving ball 128.

Figure 6:
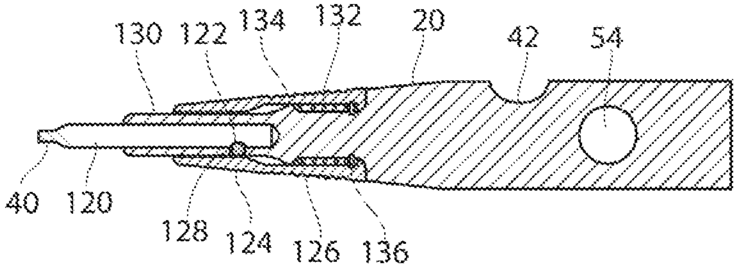
FIG. 6 is a cross-sectional view of a jaw assembly of FIG. 4.
Figure 7:
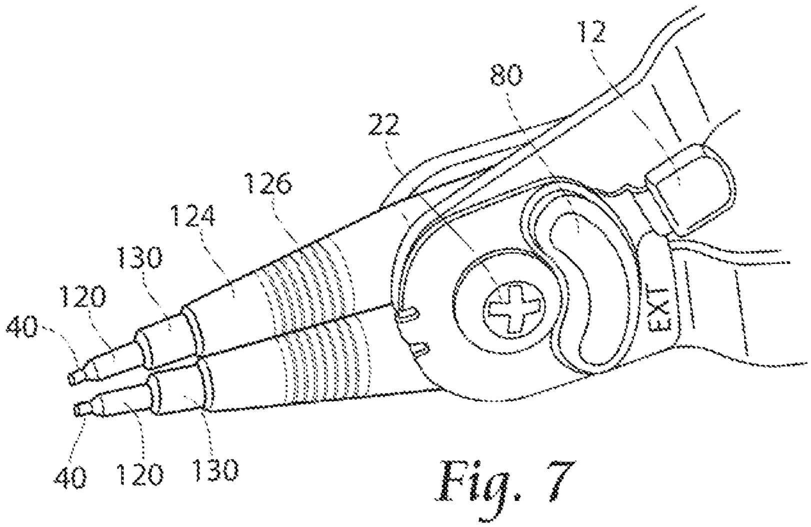
FIG. 7 is a perspective view of a pair of jaws carried by the retaining ring pliers.

Referring now to FIG. 6 a cross-sectional view of a jaw assembly 20 of FIG. 4 is shown. It is shown that tip shaft 120 fits within hollow jaw shaft 130. Ball 128 engages with detent 122 on tip shaft 120. In operation, a user engages finger grips 126 (see, e.g., FIG. 7), and pulls sleeve 124 toward tip 40. Spring retaining collar 136 compresses spring 132 between spring retaining collar 136 and step 134. This pulling action forces ball 128 from detent 122 and releases shaft 120 from gripping within jaw shaft 130. In this manner, in order to insert a different tip 40 into the jaw 20, a user pulls sleeve 124, which compresses spring 132, and while the sleeve 124 is pulled, inserts a tip shaft 120 into hollow jaw shaft 130. The user then releases sleeve 124, and tip shaft 120 is thereby secured into hollow jaw shaft 130 by ball 128 engaging detent 122.

Figure 8:
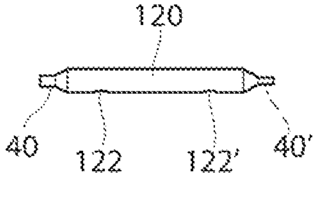
FIG. 8 is a side view of an alternate embodiment of shaft carrying a pair of differently configured tips.

Referring now to FIG. 8, a side view of an alternate embodiment of shaft 120 carrying a pair of differently sized or configured tips 40 and 40' is shown. In this embodiment, two detents 122 are provided, thereby making this alternate embodiment of shaft 120 into a reversible tip configuration.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A pliers comprising:

a jaw comprising at a proximal end a transverse cylindrical bore, and a cylindrically concave bearing recess;

said jaw further comprising a jaw shaft comprising at least one hollow portion, said jaw carrying a step;

a ball carried by said jaw shaft;

a hollow sleeve slidably carried by said jaw, said hollow sleeve having a proximal end and a distal end;

a spring retaining collar carried at said proximal end of said hollow sleeve;

said spring retaining collar engaged with said hollow sleeve and carried about said jaw shaft;

a spring disposed about said jaw between said step and said spring retaining collar;

a tip carried by a tip shaft, said tip shaft comprising a detent, said tip shaft sized and configured to be removably positioned in said hollow portion of said jaw; said detent removably coupled with said ball;

wherein sliding said hollow sleeve toward a distal end of said jaw compresses said spring between said spring retaining collar and said step and allows said tip to be coupled and uncoupled to said hollow portion of said jaw.

2. The pliers of claim 1, said hollow sleeve carrying a finger gripping structure.

3. The pliers of claim 1, said tip and said tip shaft extending from said hollow jaw shaft.

4. The pliers of claim 1, said hollow jaw shaft extending from said sleeve.

5. The pliers of claim 1, tip shaft carrying a pair of tips, and said tip shaft comprising a pair of detents.

6. The pliers of claim 1, said spring retaining collar carried within a groove about an inner surface of said hollow sleeve.

7. The pliers of claim 1, said hollow sleeve having a first inner diameter greater than a minimum outer diameter of said jaw shaft, and said hollow sleeve having a second inner diameter greater than an outer diameter of said step, said second inner diameter greater than said first inner diameter.

8. A pliers comprising:

a jaw comprising a spring engaging portion having a first diameter, and a hollow portion, said hollow portion of said jaw at a distal end of said jaw;

a step portion of said jaw at a distal end of said spring engaging portion, said step portion having a second diameter greater than said first diameter;

said hollow portion of said jaw removably coupled to a tip;

a hollow sleeve slidably carried by said jaw, said hollow sleeve having a proximal end and a distal end;

a spring retaining collar coupled to said proximal end of said hollow sleeve;

a spring disposed about said spring engaging portion of said jaw, said spring positioned between said step and said spring retaining collar, and said spring constrained between said spring engaging portion of said jaw and said hollow sleeve;

wherein sliding said hollow sleeve toward said distal end of said jaw compresses said spring between said spring retaining collar and said step and allows said tip to be coupled and uncoupled to said hollow portion of said jaw.

* * * * *